Patented Jan. 9, 1951

2,537,850

UNITED STATES PATENT OFFICE 2,537,850

DICYANDIAMIDE NITRATE

Joseph H. Paden, Stamford, Conn., and Alexander F. MacLean, Calallen, Tex., assignors to American Cyanamid Company, New York, N. Y., a corporation of Maine No Drawing. Application February 3, 1950, Serial No. 142,348

1 Claim. (Cl. 23—102)

This invention relates to the nitrate salt of dicyandiamide, $H_2NC(:NH)NHCN.HNO_3$, and to methods of preparing the same in crystalline form.

It has been recorded in the literature that dicyandiamide, a neutral compound, having a low ionization constant would not form salts with acids in aqueous solutions. In spite of this argument which refutes the formation of such salts it has now been discovered that nitrate salts of dicyandiamide can be prepared.

Dicyandiamide nitrate is soluble in water but only slightly soluble in aqueous nitric acid. The anhydrous solid is unstable when heated and the heating of large amounts is dangerous because the material is subject to decomposition with explosive violence.

The following example will serve to illustrate the preparation of dicyandiamide nitrate:

Example

Reactants:
| | Molar ratio |
|---|---|
| Dicyandiamide | 1.0 |
| Nitric acid, 67% | 2.0 |
| Water | 10.1 |

The nitric acid is carefully added to a mechanically stirred aqueous suspension of dicyandiamide at 25° C. After the addition of the nitric acid is about one-half completed, crystals of dicyandiamide nitrate separate from the solution. When the addition of the nitric acid is complete, the reaction mixture is cooled in an ice bath. The colorless crystals are filtered, washed with methyl ethyl ketone and dried under vacuum at 50° C. By means of a potentiometric titration, the molecular weight was found to agree closely with the theoretical value of 147.

Dicyandiamide nitrate does not have a sharp melting or decomposition point, and since analytical data checks the theoretical composition, the optical and crystallographic properties are presented in order to characterize the nitrate. Dicyandiamide nitrate is a white equant solid which crystallizes in the monoclinic system, has the forms (001) (hko) (hol), and has a negative optic sign. It is to be understood that the crystallographic symbols "h" and "k" are used in conjunction with the letters "o" and "l" and not the numerals zero and one. In white light the refractive indices are as follows: $\alpha=1.362$; $\beta=1.615$; and $\nu=1.687$. The apparent optic axial angle as observed in air is 63°, and the true optic axial angle calculated therefrom is 38°. The optic axial plane or principal optic section is (010). The principal vibration direction of $\nu$ is at an angle of 16°45'±30' to the crystallographic axis "c."

The nitrate salt of dicyandiamide is useful as a chemical intermediate, chemotherapeutic agents, insecticides, explosives, synthetic resins and for other purposes.

This is a continuation-in-part of applicants' co-pending application, Serial No. 624,576, filed October 25, 1945, now abandoned.

While the invention has been described with particular reference to specific embodiments, it is to be understood that it is not to be limited thereto but is to be construed broadly and restricted solely by the scope of the appended claim.

We claim:

Crystalline dicyandiamide nitrate, of the empirical formula $H_2NC(:NH)NHCN.HNO_3$, one phase of said compound crystallizing in the monoclinic system and having refractive indices in white light of approximately $\alpha=1.362$, $\beta=1.615$, and $\nu=1.687$.

JOSEPH H. PADEN.
ALEXANDER F. MacLEAN.

REFERENCES CITED

The following references are of record in the file of this patent:

FOREIGN PATENTS

| Number | Country | Date |
|---|---|---|
| 17,507 | Great Britain | 1902 |